United States Patent [19]
Gordon

[11] Patent Number: 5,191,856
[45] Date of Patent: Mar. 9, 1993

[54] ANIMAL TOY

[76] Inventor: Richard Gordon, 95 W. 3rd St., Freeport, N.Y. 11520

[21] Appl. No.: 931,832

[22] Filed: Aug. 18, 1992

[51] Int. Cl.$^5$ ............................................. A01K 15/00
[52] U.S. Cl. ................................... 119/29.5; 446/419
[58] Field of Search .............. 119/29, 29.5; 446/419; 482/121, 126, 905, 906

[56] References Cited

U.S. PATENT DOCUMENTS

| | | | |
|---|---|---|---|
| 980,025 | 12/1910 | Titus | 119/29.5 |
| 1,023,756 | 4/1912 | Pons | 482/126 X |
| 2,959,354 | 11/1960 | Beck | 119/29.5 X |
| 4,290,600 | 9/1981 | Kölbel | 482/126 |

Primary Examiner—Gene Mancene
Assistant Examiner—Thomas Price
Attorney, Agent, or Firm—Bauer & Schaffer

[57] ABSTRACT

A toy including a tube, releasably closed at both ends and by closure members placed under tension by a spring located in the tube and having disposed in the interior a material which exhibits a positive sensory attraction to an animal.

7 Claims, 1 Drawing Sheet

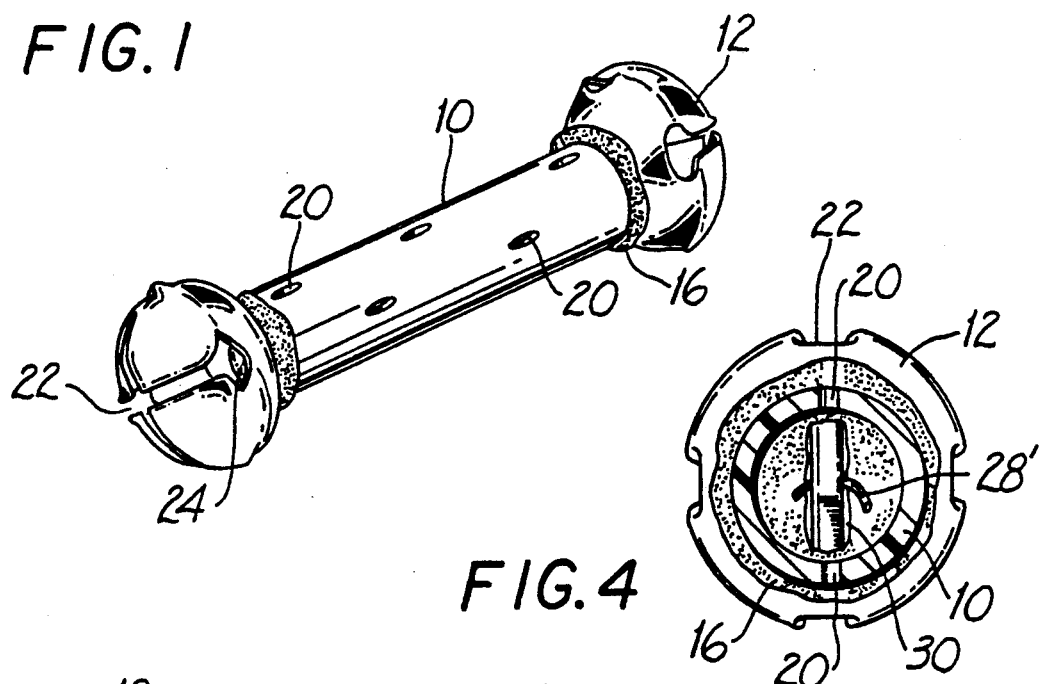
FIG. 1
FIG. 4
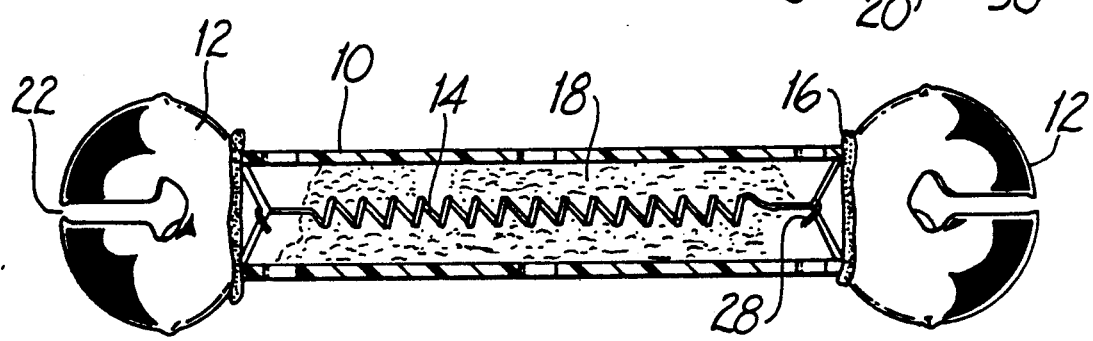
FIG. 2
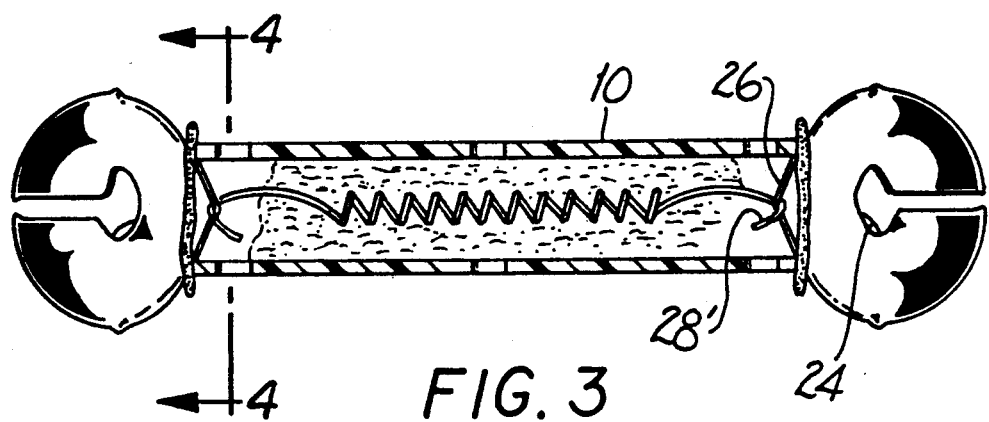
FIG. 3

ANIMAL TOY

BACKGROUND OF THE INVENTION

The present invention relates to a cat's toy.

Cats are very attracted to scents, particularly that of an herb commonly known as "catnip" and will therefore seem to play with objects that have a scent rather than objects of particular shape or color. There exists, therefore, need for toys which are attractive to cats and which will make them play with it for extended periods of time.

It is the object of the present invention to provide a toy consisting of a container for catnip or the like.

BRIEF STATEMENT OF THE INVENTION

In accordance with the present invention there is provided an animal toy comprising a hollow tube having a closure at each end and having disposed in the interior thereof material which exceeds a positive odorous attraction to the animal. The closures are held in abutment to the ends of the tube by spring means located within the tube. When the animal plays with the toy the scent escapes from the ends and further attracts the animal for prolonged play.

Preferably, the closures are spherical bells, which not only provide decoration and sound but are provided with holes and slots through which the scent may escape. The spring means connect both bells under tension permitting the bells to be pulled from the end of the tube to permit filling of the tube with catnip.

Full details of the invention are set forth in the following description and illustrated in the accompanying drawing.

BRIEF DESCRIPTION OF THE DRAWINGS

IN THE DRAWINGS

FIG. 1 is a perspective view of the animal toy in accordance with the invention;

FIG. 2 is a longitudinal cross sectional view of the toy shown in FIG. 1;

FIG. 3 is a view similar to FIG. 2 illustrating another form of the spring used in the toy; and FIG. 4 is a diametric cross-sectional view taken in its direction of IV—IV.

DESCRIPTION OF THE PREFERRED EMBODIMENTS

Referring now to FIG. 1, an animal toy according to the invention has the overall appearance of a small dumbbell and comprises a tube 10 which is releasable closed at both ends by a closure member 12. The closure members are drawn tightly, but not sealingly, against the ends of the tube 10 by a spring 14, connecting both closures 12 under tension. Interposed between the closure members 12 and the ends of the tube 10, respectively, is a small thin foam plastic pad 16. Disposed within the interior of the tube 10 is a quantity of, at least one material 18 which exhibits a positive attraction to the animal.

A wide variety of material, either metal or plastic can be employed to form the tube 10. Suitable metals can be aluminum or the like, while the plastic materials may include non-toxic substantially inert, thermosetting or thermoplastic materials such as polyvinyl chloride, polyeurthane, etc. The tube 10 is preferably rigid hollow rod stock. The cross section of the tube is not critical and while a cylindrical tube is shown, it can be octagonal, square or other polygonal shape.

The attractant material disposed in the tube is a positive sensory attractant to an animal. As used herein, the term sensory attractant is intended to include those materials which excite the olfactory and/or gustatory nerves and senses as opposed to those which excite the eye or the sense of touch. Such materials may be selected from a wide group of natural teas or herbs such as "catnip" or artificial chemical compositions. The tube is provided with a quantity of this material in granular, flake or powder form to substantially fill the tube. In a preferred form, the inserted material is generally flake or large granular particles, difficult to escape from the end of the tube. The tube as well as the closure can of course be brightly color to provide an additional attraction.

If desired, the tube may be provided with pores or holes 20 which may be small enough so that normally the material does not escape but which allows the aroma to be released when played with.

The closure members 12 are preferably, spherical bells, having a plurality of slots and opening 22 and in side of which is located a hard ball 24. The bottom of the bell is provided with a bridge like member 26, pulled away from the spherical surface to provide an opening into the bell in communication with the interior of the tube. The bridge 26 also acts as the attachment anchor for the spring 14. Other closure members such as flat washer, or washer-like disks, with or without noise makers in the interior thereof, can be used.

The spring 18 is preferably a helical compression spring having a hook 28 at each end which attaches to the bridge member 26 on the bell or other closure. In FIG. 2, the hook 28 is short providing the spring with a relatively long helix. In FIG. 3, the hook is longer. This latter length enables the closure 12 to be pulled away from the tube a greater distance without carrying with it the catnip or other attractant material. The spring should provide sufficient tension that when the toy is not in use the ends of the tube are so close as to keep the attractant material from evaporating or disappearing, while in use to allow just so much separation that the fragrance of the attractant readily escapes.

The hooked ends 28 of the springs 18 permit the bell to be removed providing access into the tube for replacement of the scented material.

The sealing pad 16 is preferably made of thin sheet foam so as to insure proper seating of the closure 12 against the tube ends. The sheet pad 16 is whole and its integrity is unbroken except for a small slit 30 at it's center through which the bridge 26 of the closure passes. After passing the bridge through the slit, the pad tends to close-up again.

The animal toy of the invention and the process of making the same present many advantages. The toy can be made by the described process in a simple manner, using readily available materials. The toy can be made in a variety of sizes without greatly altering the materials used and the manipulative step of its construction. In its preferred form, using catnip in flakes or large size powder form the invention provides a toy which causes a cat to be attracted thereto and play therewith for prolonged periods of time. Since the closure bells are easily releasible, catnip may be replaced when the scent is exhausted or when desired to change the odor. Moreover, other advantages of the invention will be apparent to those skilled in the art.

It is to be understood, therefore, that numerous modifications of this invention can be made without departing from the spirit and scope of the invention, and therefore, the invention is not to be limited to the described embodiments, except as defined in the appended claims.

What is claimed is:

1. An animal toy comprising a hollow tube, a closure at each end of said tube, and spring means located within said tube to normally tension said closure into abutment with the ends of said tube, and a quantity of scented material is housed in said tube and the tension on said closures is such as to permit the escape of said material scent and prevent the escape of the material.

2. The animal toy according to claim 1 wherein said closures comprises spherical body and said spring means connects said spherical bodies together.

3. The animal toy according to claim 2 wherein said spherical bodies have holes therein through which the scent from said tube can escape.

4. The animal toy according to claim 3 wherein said spherical bodies comprises bells.

5. An animal toy comprising a hollow tube adapted to contain a quality of an odor exuding material, a closure at each end comprising a sphere housing a bell, and a spring connecting said bells under tension to abut the respective ends of said tube.

6. The animal toy according to claim 5, included a pad interposed between each of said closure and said tube end.

7. The animal toy according to claim 5 wherein said bell is removable from said spring to provide access into said tube for replacement of each odor exuding material.

* * * * *